United States Patent

[11] 3,576,549

[72] Inventors Martin S. Hess
Hopewell Junction;
Walter F. Krolikowski, Poughkeepsie, N.Y.
[21] Appl. No. 815,971
[22] Filed Apr. 14, 1969
[45] Patented Apr. 27, 1971
[73] Assignee Cogar Corporation
Utica, N.Y.

[54] SEMICONDUCTOR DEVICE, METHOD, AND MEMORY ARRAY
36 Claims, 37 Drawing Figs.

[52] U.S. Cl. .......... 340/173SP, 29/586
[51] Int. Cl. .......... G11c 17/00, G11c 7/00, G11c 11/34
[50] Field of Search .......... 340/173; 307/248, 256

[56] References Cited
UNITED STATES PATENTS
3,245,051 4/1966 Robb .......... 340/173
3,412,220 11/1968 Puppolo et al. .......... 340/173X
OTHER REFERENCES
IBM Technical Disclosure Bulletin, " Memory Array" by DeWitt et al., Vol. 10, No. 1, 6/67, page 95, copy in 340-173.

*Primary Examiner*—Stanley M. Urynowicz, Jr.
*Attorney*—Harry M. Weiss

ABSTRACT: This disclosure relates to a semiconductor device which has a first electrical state prior to the application of a particular voltage to at least one conductor thereof and a second, different, irreversible electrical state after the voltage was applied to the selected conductor. A method of forming an electrical contact is also disclosed which is achieved by breaking down a portion of the insulator of the semiconductor device by the application of a voltage to a conductor located on the insulator thereby permitting electrical contact to the semiconductor by the conductor. Additionally, a memory array is disclosed which permits a write-once, read-only function or operation by using an insulator breakdown technique to change semiconductor devices of the array from a first electrical state to a second, irreversible and different electrical state.

INVENTORS
MARTIN S. HESS
WALTER F. KROLIKOWSKI
BY Harry M Weiss
ATTORNEY

FIG. 9
BEFORE INSULATOR BREAKDOWN
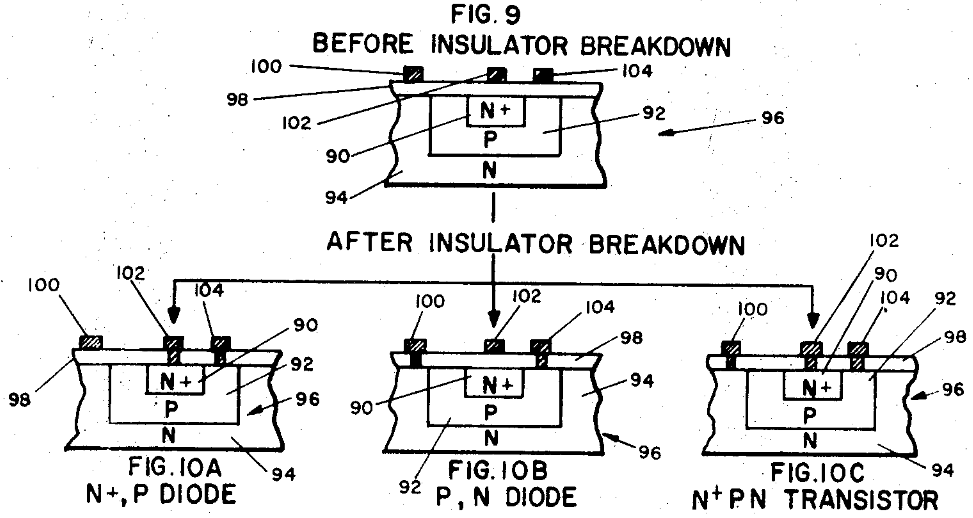
FIG. 10A FIG. 10B FIG. 10C
FIG. 13
BEFORE INSULATOR BREAKDOWN
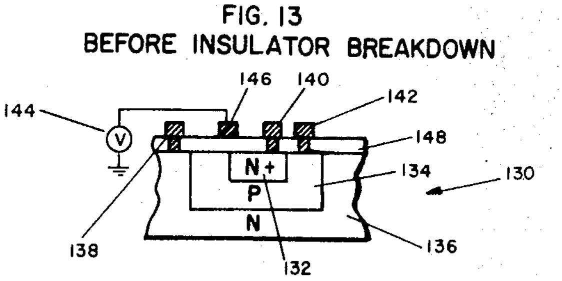
FIG. 13A
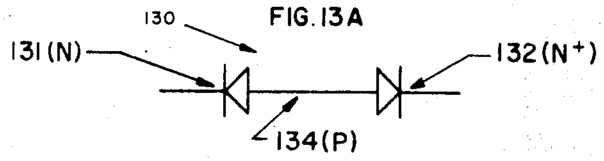
FIG. 14
AFTER INSULATOR BREAKDOWN
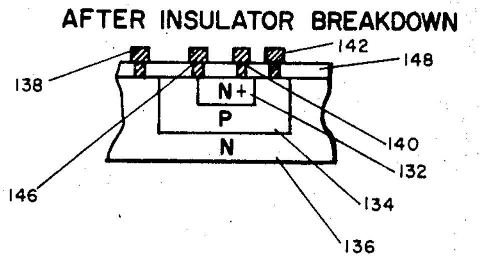
FIG. 14 A
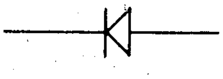

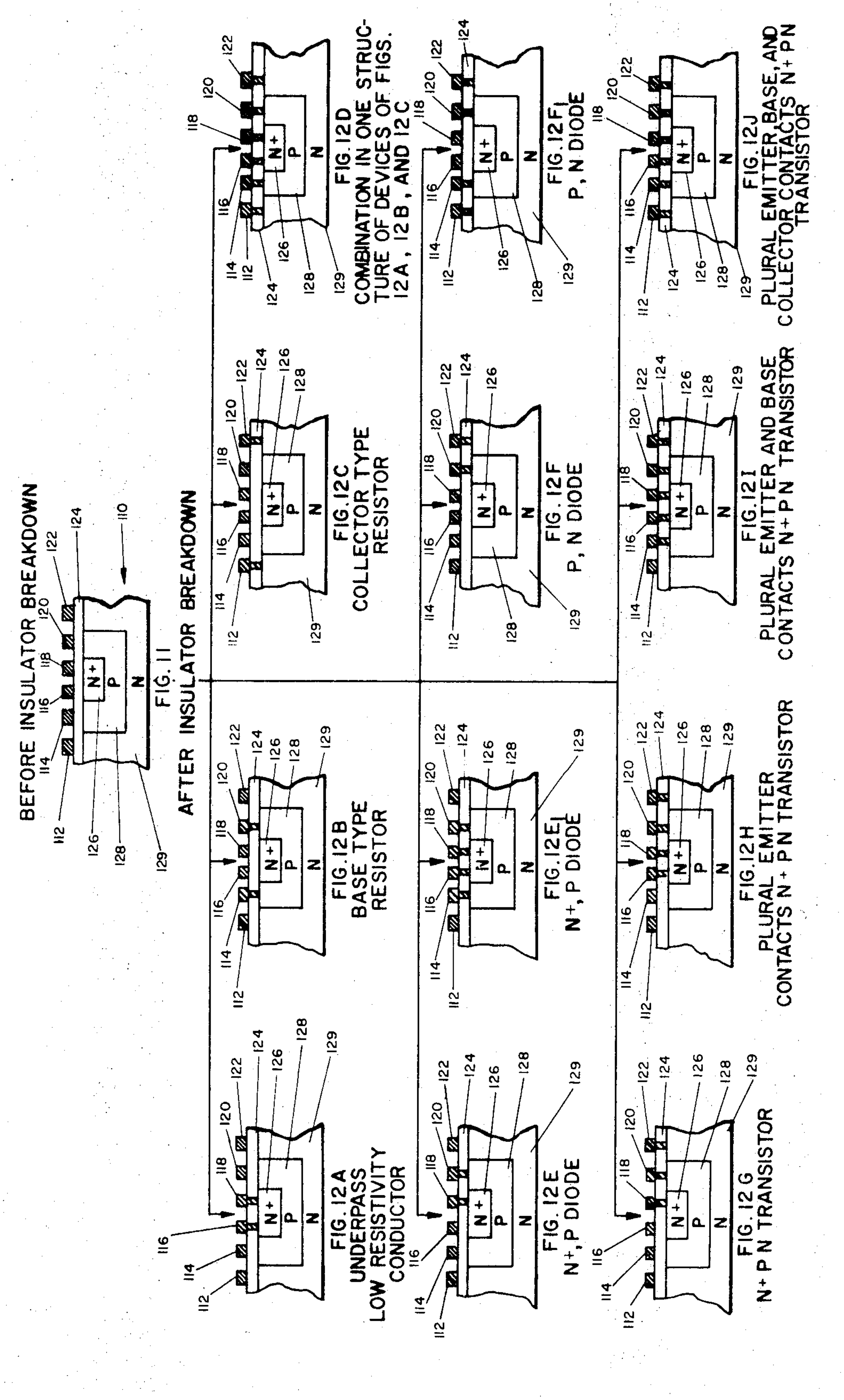
FIG. 11, FIG. 12A, FIG. 12B, FIG. 12C, FIG. 12D, FIG. 12E, FIG. 12E1, FIG. 12F, FIG. 12F1, FIG. 12G, FIG. 12H, FIG. 12I, FIG. 12J

BEFORE INSULATOR BREAKDOWN
AFTER INSULATOR BREAKDOWN

FIG. 12A UNDERPASS LOW RESISTIVITY CONDUCTOR
FIG. 12B BASE TYPE RESISTOR
FIG. 12C COLLECTOR TYPE RESISTOR
FIG. 12D COMBINATION IN ONE STRUCTURE OF DEVICES OF FIGS. 12A, 12B, AND 12C
FIG. 12E $N^+$, P DIODE
FIG. 12E1 $N^+$, P DIODE
FIG. 12F P, N DIODE
FIG. 12F1 P, N DIODE
FIG. 12G N+PN TRANSISTOR
FIG. 12H PLURAL EMITTER CONTACTS N+PN TRANSISTOR
FIG. 12I PLURAL EMITTER AND BASE CONTACTS N+PN TRANSISTOR
FIG. 12J PLURAL EMITTER, BASE, AND COLLECTOR CONTACTS N+PN TRANSISTOR

WRITE-ONCE, READ-ONLY MEMORY ARRAY

WRITE-ONCE, READ-ONLY MEMORY ARRAY

SEMICONDUCTOR DEVICE, METHOD, AND MEMORY ARRAY

BACKGROUND OF THE INVENTION

1. Field of the Invention

This invention relates generally to semiconductor devices including method and memory arrays using these devices, and, more particularly, to semiconductor devices, useful alone or in memory arrays, that are changed from one electrical state to a second, irreversible and different electrical state upon the application of a voltage thereto having a magnitude and duration sufficient to cause insulator breakdown of the semiconductor device.

2. Description of the Prior Art

In the past, the electrical nature of a semiconductor device (i.e. transistor, diode, resistor, etc.) was generally fixed and unalterable after the device was fabricated and electrical or ohmic contacts were provided to the different active regions of the device. For example, active semiconductor devices such as a diode or transistor device fabricated by conventional diffusion and/or epitaxial techniques could only perform the diode or transistor electrical function after contacts were applied thereto. Similarly, semiconductor passive devices, such as resistors and capacitors, provided only their passive electrical function after contacts were applied thereto. Hence, both active and passive devices were generally considered to have a fixed electrical nature or function after complete fabrication thereof.

For many device or circuit applications it was very desirable to have some rapid electrical pulse or voltage method or means of changing the electrical function of an active or passive semiconductor device, after complete fabrication thereof, from one electrical function or state to a second and different electrical function or state so that the device could provide a greater degree of use flexibility for discrete or integrated applications such as monolithic logic or memory. Particularly, in the commercially important area of write-once, read-only memory arrays, it was very desirable to have available a memory array which can be written into only once and have the memory array thereafter serve as a constant read-only memory.

Various techniques were previously considered and tried for providing a write-once, read-only semiconductor memory array which primarily relied upon techniques using laser or electron beams to physically destroy electrical conductors or connections in the memory array to delete or remove from the memory circuit certain devices in order to achieve writing of information into the memory array. These conductor destruction or device deletion techniques using laser or electron beams are very difficult to employ from a production standpoint due to the complexity of the laser or electron beam apparatus needed to achieve controlled conductor destruction or device deletion operation. Hence, reliability is a problem for this laser or electron beam technique due to alignment, size and tolerance considerations, which also created a cost problem. A need existed for providing a write-once, read-only semiconductor memory array which could be easily operated by the application of a write voltage or signal to selected devices of the memory array.

SUMMARY OF THE INVENTION

Accordingly, it is an object of this invention to provide an improved semiconductor device and method.

It is a further object of this invention to provide an improved semiconductor memory array.

It is a still further object of this invention to provide a method for forming either an active or passive semiconductor device which has a first electrical state before application of a particular voltage thereto and a second, different and irreversible electrical state after application of the voltage.

It is still another object of this invention to provide a write-once, read-only semiconductor memory array which can be rapidly and easily written into by means of an electrical pulse or voltage signal.

DESCRIPTION OF THE PREFERRED EMBODIMENTS

In accordance with one embodiment of this invention, a semiconductor device is provided which comprises a semiconductor substrate having at least one region of one type conductivity forming a part of the substrate. A thin insulating layer is located on one surface of the substrate and at least one conductor is located on the thin insulating layer over the region of one type conductivity. Means are provided for applying a voltage to the conductor of a sufficient magnitude and duration to break down the portion of the insulating layer located beneath the conductor. The conductor becomes an ohmic contact to the region of one type conductivity after breakdown of the insulating layer portion. The semiconductor region of one type conductivity and the conductor in ohmic contact therewith provide at least a portion of either an active or passive semiconductor device. Preferably, the thin insulating layer has a thickness in the range of from about 50 to about 1000 Angstroms and the voltage applied to the conductor to break down the portion of the insulating layer located beneath the conductor is less than 100 volts.

In accordance with another embodiment of this invention, a method is provided for forming an electrical contact to a region of a semiconductor device which includes the formation of a thin insulating layer on the surface of a semiconductor substrate containing at least one region of one type conductivity. At least one conductor is deposited on the thin insulating layer and separated from the one region of one type conductivity by the thin insulating layer. A voltage of a sufficient magnitude and duration is applied to the conductor to break down the portion of the insulating layer located beneath the conductor to provide electrical contact to the one region of the substrate. The electrical contact that is formed is an ohmic contact. Additionally, a method is also provided for forming either an active or a passive device using the insulation layer breakdown technique of this invention.

In accordance with still another embodiment of this invention, a semiconductor memory array is provided which comprises a plurality of interconnected semiconductor devices to form the array. Each of the plurality of semiconductor devices comprises a semiconductor substrate having a thin insulating layer located on a surface of the substrate and at least one conductor located on the thin insulating layer. Writing means for writing information into the semiconductor memory array are provided by the application of a voltage of a sufficient magnitude and duration to the one conductor of a selected memory device to cause breakdown of the portion of the thin insulating layer located beneath the conductor so as to provide electrical contact to the substrate and thus change the electrical nature of the selected semiconductor device. Reading means are also provided for sensing the information contained in the semiconductor memory array. Each semiconductor or memory device of the array has a first electrical state prior to receiving a writing signal and an irreversible, different, second electrical state after receiving a writing signal. In one embodiment, the first electrical state of each semiconductor device prior to receiving a writing signal is a resistor.

The foregoing and other objects, features and advantages of the invention will be apparent from the following more particular description of the preferred embodiments of the invention, as illustrated in the accompanying drawings.

BRIEF DESCRIPTION OF THE FIGURES

FIG. 9 is a transistor type semiconductor device similar to FIGS. 5 and 7 except that none of the conductors or contacts, which are in section, is electrically connected to the emitter, base or collector regions before insulator breakdown.

FIG. 10A shows an N+, P diode after insulator breakdown beneath two of the conductors of the device of FIG. 9; FIG. 10B is a P,N diode formed after insulator breakdown beneath two of the conductors of the device of FIG. 9; and FIG. 10C is an N+PN transitor device formed after insulator breakdown beneath all three conductors of the device of FIG. 9.

FIG. 11 is a side elevational view of a transistor type semiconductor device showing six conductors or contacts, in section, above the N+, P, and N regions of the device prior to insulator breakdown.

FIGS. 12A, 12B, 12C and 12D depict the underpass and resistor type devices that are formed after insulator breakdown beneath at least two conductors located over one or more of the semiconductor regions of the device of FIG. 11.

FIGS. 12E, $12E_1$, 12F, and $12F_1$ depict various diodes that are formed after insulator breakdown beneath at least one conductor located over each of two semiconductor regions of the device of FIG. 11.

FIGS. 12G, 12H, 12I and 12J depict transistor devices that are formed after insulator breakdown beneath at least three conductors of the device of FIG. 11.

FIG. 13 is a side elevational view, with the contacts or conductors, shown in section, of a back-to-back diode type semiconductor device prior to insulator breakdown.

FIG. 13A is an electrical schematic representation of the device of FIG. 13.

FIG. 14 is a view of the device of FIG. 13 after insulator breakdown showing shorting of the N+P junction of the device.

FIG. 14A is an electrical schematic representation of the device of FIG. 14.

Referring to FIG. 1, a semiconductor substrate 10 contains an N+ region 12 and a P region 14. The N+ region 12 and/or the P region 14 is formed either by diffusion or epitaxial growth techniques, etc. Electrical conductor or ohmic contact 16 is provided to the N+ region 12 by means of conventional photolithographic masking and etching techniques which form an opening in thin insulating layer 18 located on one surface of the semiconductor substrate 10. The contact 16 and conductor 20 located above the N+ region 12 and separated therefrom by the thin insulating film or layer 18 are deposited by conventional evaporation or sputtering techniques and thereafter defined by conventional metal masking and etching techniques. Metals that can be used for providing this electrical ohmic contact to the semiconductor device are aluminum, platinum, etc.

Figures 1, 2, 3, 4, 5, 6:
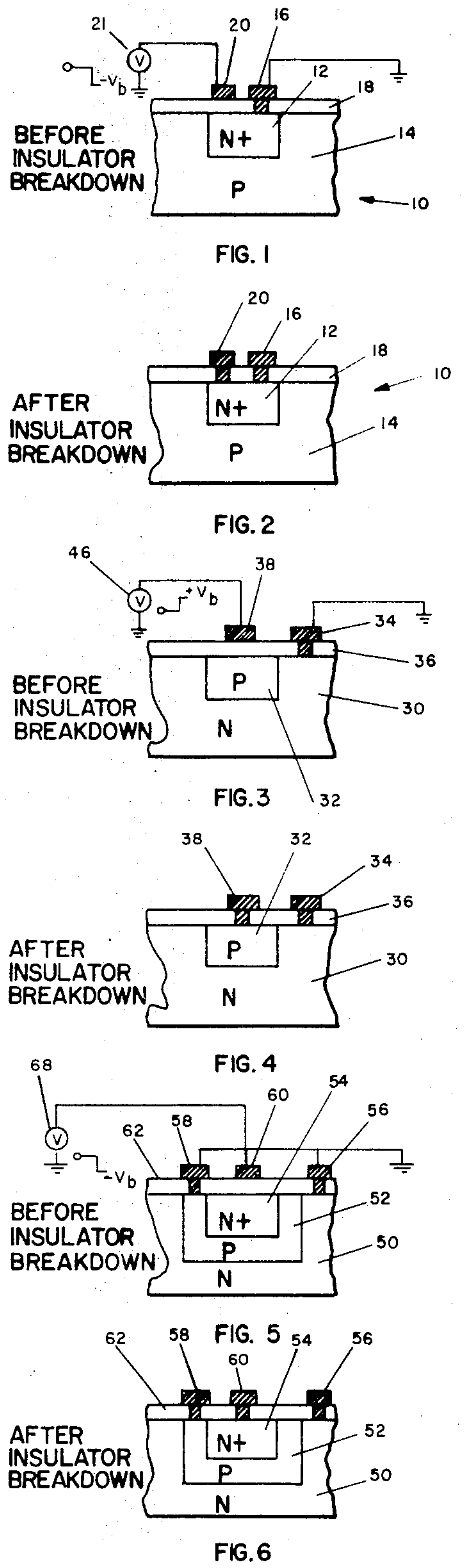
FIG. 1 is a side elevational view of a semiconductor device showing the electrical conductors or contacts, in section, prior to insulator breakdown beneath one of the conductors.
FIG. 2 is the device of FIG. 1 after insulator breakdown.
FIG. 3 is a side elevational view of a diode type semiconductor device, with the contacts or conductors shown in section, prior to insulator breakdown beneath one of the conductors.
FIG. 4 is the device of FIG. 3 after insulator breakdown.
FIG. 5 is a side elevational view of a transistor type semiconductor device, with the contacts or conductors shown in section, prior to insulator breakdown beneath the conductor located over the emitter region of the device.
FIG. 6 is the semiconductor device of FIG. 5 after insulator breakdown.

The device shown in FIG. 1 is prior to insulator breakdown which is caused by the application of a voltage $-V_b$ from voltage source 21 to the conductor 20. The voltage applied to the conductor 20 to break down the insulator portion beneath the conductor 20 is of sufficient magnitude and duration to cause insulator breakdown. The thin insulating film 18 is preferably of silicon dioxide where a silicon substrate is utilized but can be formed of other suitable insulating materials such as alumina, silicon nitride, etc. The thin insulating film 18 can be formed by thermal oxide growth techniques ($SiO_2$) or by evaporation, pyrolytic or sputtering methods, etc. The film 18 has a thickness in the range of about 50 to about 1,000 Angstroms. Preferably, the thin insulating film 18 has a thickness in the range of about 100 to about 600 Angstroms to facilitate insulator breakdown. The magnitude of the voltage applied to the conductor 20 to break down the portion of the thin insulating film 18 located beneath the conductor 20 is less than 100 volts and preferably in the range of from about 5 to about 50 volts depending upon the thickness of the film and the material thereof. Doping the insulating film with phosphorous, for example, to form a phosphosilicate glass or insulating layer can, under some conditions, enhance insulator breakdown with lower voltage. For very thin insulating films, a voltage magnitude or amount in the range of about 5 to about 30 volts is used to break down the thin insulating film portion beneath the conductor 20. The duration of the breakdown voltage pulse $V_b$ needed to break down the insulating film portion located beneath the conductor 20 is very short and on the order of fractions of a second.

The N+ region 12 has a Co of at least $10^{20}$ impurities per cubic centimeter while the P region 14 has a Co of below $10^{20}$ impurities per cubic centimeter. The N+ region 12 is suitably doped with an N-type dopant such as phosphorous, arsenic, etc. The P region 14 is suitably doped with a P-type dopant such as boron. Preferably, the semiconductor substrate is made of monocrystalline silicon which is formed by conventional growth techniques using a seed to form a single crystal, doped, silicon bar from a melt and thereafter slicing the bar into wafers or substrates.

Figures 1A, 2A, 3A, 4A, 5A, 6A:
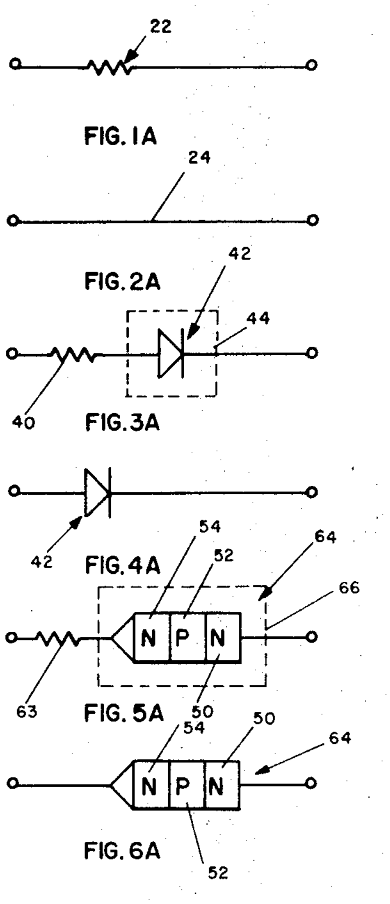
FIG. 1A is an electrical schematic representation of the device of FIG. 1.
FIG. 2A is an electrical schematic representation of the device of FIG. 2 after insulator breakdown.
FIG. 3A is an electrical schematic representation of the device of FIG. 3.
FIG. 4A is an electrical schematic representation of the device of FIG. 4.
FIG. 5A is an electrical schematic representation of the device of FIG. 5.
FIG. 6A is an electrical schematic representation of the device of FIG. 6.

FIG. 1A is the electrical schematic representation of the semiconductor device of FIG. 1. Resistor 22 of the FIG. 1A is electrically equivalent to the device of FIG. 1 provided substantially by the high resistance of the portion of the thin insulator layer 18 located between the conductor 20 and the N+ region 12. Hence, the electrical equivalent of the device of FIG. 1, before insulator breakdown, is the resistor 22 of FIG. 1A.

Referring to FIG. 2, the same reference numbers are used to refer to the same or corresponding elements of the device of FIG. 1 since FIG. 2 shows the device of FIG. 1 after insulator breakdown. In FIG. 2, the conductor 20 is shown in electrical or ohmic contact with the N+ region 12 after insulator breakdown is caused by application of a voltage breakdown pulse $V_b$. Reference to FIG. 2A indicates that the two contacts 16 and 20 provide a low resistivity, underpass conductor 24 when both are in ohmic contact with the N+ region 12. The resistor 22 of FIG. 1A is no longer present in FIG. 2A since the device of FIG. 2 operates substantially as an underpass conductor after insulator breakdown beneath conductor 20.

Referring to FIG. 3, a PN diode type semiconductor device is shown which is fabricated by conventional diffusion and/or epitaxial growth techniques. In this embodiment, N-type region 30 is in physical and electrical contact with a P-type region 32 which would normally provide a PN diode semiconductor device upon the application of ohmic contact to the P and N regions of the diode device. However, in this embodiment, only conductor contact 34 is in electrical contact with the N region 30 before and after insulator breakdown as shown in FIGS. 3 and 4, respectively. A thin insulating layer 36 electrically isolates conductor 38 from the P-type region 32 prior to insulator breakdown (see FIG. 3). The electrical schematic representation of the device of FIG. 3 is shown by FIG. 3A wherein a resistor 40 is shown connected in series with a diode 42 which is depicted as being contained within a dotted box 44 to indicate that the diode 42 exists physically in the semiconductor device of FIG. 3, but does not exist electrically until the conductor 38 is in ohmic contact with the P-type region 32 after insulator breakdown (see FIG. 4). Insulator breakdown is achieved, similar to the embodiment of FIGS. 1 and 2, by applying a breakdown voltage $V_b$ by means of voltage source 46 connected to the conductor 38 to break down the insulator portion located beneath the conductor 38. An electrical schematic representation of the device of FIG. 4 is shown in FIG. 4A wherein the resistor 40 (see FIG. 3A) that existed prior to insulator breakdown because of the resistance provided by the thin insulator layer portion beneath the conductor 38 is no longer present. Hence, the device of FIG. 4 is electrically depicted as the diode 42 in FIG. 4A after insulator breakdown. Thus, the device of FIG. 3 is essentially a resistor or passive type device and the device of FIG. 4 is a diode or active type device.

FIGS. 5 and 6 depict a transistor type semiconductor device before and after insulator breakdown, respectively. In the device shown in FIG. 5, an N-type collector region 50 is in contact with a P-type base region 52 which in turn is in contact with an N+ emitter region 54. Ohmic contact 56 is provided to the collector region 50 and ohmic contact 58 is provided to the base region 52. Conductor 60 is located over the emitter region 54 and separated therefrom by a thin insulating layer 62. The electrical schematic representation of the device of FIG. 5 is shown in FIG. 5A as a resistor 63 in series with a transistor 64. However, the transistor 64 only exists physically in the device of FIG. 5, but does not exist electrically until the conductor 60 is in ohmic contact with the emitter 54. Hence, the dotted box 66 around the transistor 64 in FIG. 5A indicates that the transistor 64 only exists physically and not electrically until insulator breakdown.

After insulator breakdown, which is effected by applying a voltage from voltage source 68 to the conductor 60, a transistor device is provided as shown in FIG. 6 with the conductor 60 in ohmic contact with the emitter region 54. The device of FIG. 6 is shown in electrical schematic form by FIG. 6A as the transistor 64. The resistor 63 present in FIG. 5A, for the same reason the resistor of FIGS. 1A and 3A are shown, is no longer present in FIG. 6A after insulator breakdown.

Figures 7, 8:
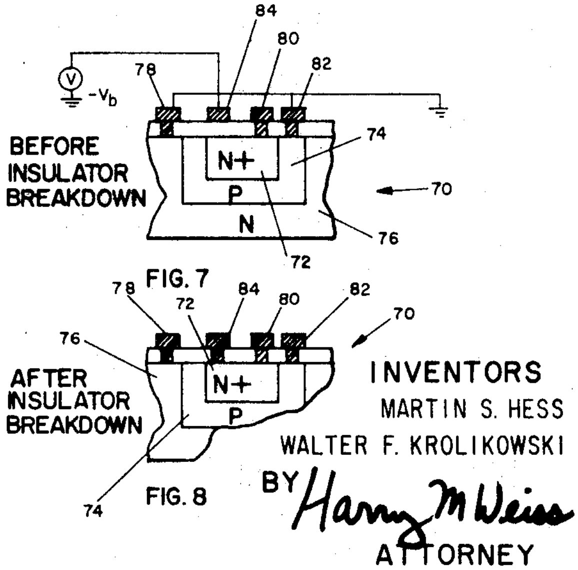
FIG. 7 is a variation of the transistor type semiconductor device of FIG. 5 showing, in section, contacts to the emitter, base and collector regions of the device prior to insulator breakdown beneath a second conductor located over the emitter region of the device.
FIG. 8 is the semiconductor device of FIG. 7 after insulator breakdown.

Referring to FIG. 7, transistor type device 70 comprises an N+ emitter region 72, a P-type base region 74, and an N-type collector region 76. Electrical contacts 78, 80 and 82 are provided to the collector, emitter and base regions, respectively. In this embodiment, the transistor device 70 is first tested, to determine operability as a transistor, by using the contacts 78, 80 and 82. Subsequent to the operation and qualification of the transistor device 70 as a suitable active device, the device 70 is available for use in circuit applications as the device of FIG. 5, by severing electrical contact to the conductor 80. Consequently, the transistor device 70 of FIG. 7 is available to act as electrically shown in FIG. 5A prior to insulator breakdown.

FIG. 8 depicts the device of FIG. 7 after insulator breakdown of is now used as a transistor which includes contacts 78, 84 and 82 to the collector, emitter, and base regions, respectively. If desired, contact 80 can also be used to provide a plural contact to the emitter 72 of the transistor device 70. Accordingly, the device of FIG. 7, permits qualification of the transistor device prior to use as the device of FIG. 5.

Referring to FIG. 9, a transistor type semiconductor device is shown prior to insulator breakdown, N+ region 90, P-type region 92, and N-type region 94 comprise transistor type device 96. A thin insulating layer 98 is located on a surface of the semiconductor substrate. Conductors 100, 102 and 104 are located on the insulating layer 98 and respectively disposed over and separated from the N-type region 94, the N+ region 90 and the P-type region 92.

FIGS. 10A, 10B and 10C show different semiconductor device arrangements that are achieved after insulator breakdown beneath selected two or three of the conductors of the device shown in FIG. 9. Similar reference numerals are used in FIGS. 10A, 10B and 10C to depict the same elements of the same type device shown in FIG. 9. In FIG. 10A, an N+,P diode is depicted after insulator breakdown is caused by applying a suitable voltage to the conductors 102 and 104 to permit electrical contact between conductor 102 and N+ region 90 and between conductor 104 and P-type region 92.

In FIG. 10B, a PN diode is formed by applying a breakdown voltage to the conductors 100 and 104 of the device of FIG. 9 which causes, by insulator breakdown, electrical contact between the conductor 100 and N-type region 94 and between conductor 104 and P-type region 92.

Similarly, in the embodiment of FIG. 10C, a breakdown voltage applied to each of the conductors 100, 102 and 104 of the device of FIG. 9 achieves electrical contact to N-type region 94, N+ region 90 and P-type region 92, respectively. In this embodiment, an NPN transistor device is provided by the insulator breakdown technique of this invention.

Referring to FIG. 11, a semiconductor device 110 is shown having six conductors 112, 114, 116, 118, 120, 122 located on a thin insulating layer 124. N+ region 126 is located beneath conductors 116 and 118. P-type region 128 is located between the N+ region 126 and N-type region 129. Conductors 114 and 120 are spaced from the P-type region 128 by the thin insulating layer 124. Conductors 112 and 122 are spaced from N-type region 129 by the thin insulating layer 124. FIG. 11 depicts the semiconductor device 110 prior to insulator breakdown beneath two or more of the conductors located on the thin insulating layer 124.

FIGS. 12A, 12B, 12C, 12D depict various semiconductor devices that are formed using the N+, P-and N-type regions alone or in combination. FIG. 12A depicts an underpass low resistivity conductor device (similar to the device of FIG. 2) which is formed by breaking down the insulator portions beneath conductors 116 and 118. The underpass low resistivity conductor device of FIG. 12A is particularly useful in providing an underpass low resistance connection between semiconductor devices thereby permitting conductors to crossover the insulator surface portion of the device perpendicular to and between the conductors 116 and 118.

In FIG. 12B, a resistor is formed using the P-type or base region 128. Conductors 114 and 120 are subjected to a voltage pulse as described earlier with reference to the other FIGS. to break down the insulator portion beneath the conductors 114 and 120. Ohmic contact is thus provided between conductors 114 and 120 and the P-type region 128.

In FIG. 12C a collector type resistor device is formed by the insulator breakdown technique of the insulator portion located beneath conductors 112 and 122. Generally, the resistance of the collector region 129 is higher than the resistance of the base type region 128 which provides a higher resistance value for the resistor device of FIG. 12C than for the resistor device of FIG. 12B.

In FIG. 12D, a combination of devices as shown in FIGS. 12A, 12B, and 12C is depicted which can be used to provide different resistor or conductor values for electrical connection to other semiconductor devices located in the same integrated structure.

Referring to FIGS. 12E, $12E_1$, 12F and $12F_1$, various types of diode devices are shown which are formed by the insulator breakdown beneath selected conductors. In FIG. 12E, an N+,P diode device is formed by the insulator breakdown technique permitting ohmic contact between conductor 118 and the N+ region 126 and between conductor 120 and the P or base type region 128. Similarly, an N+,P diode device can be formed of the device of FIG. 11 using conductors 116 and 114. In FIG. $12E_1$, contacts 116 and 118 are made to the N+ type region 126 by the insulator breakdown technique of this invention on the device of FIG. 11 thereby permitting additional wiring or connection flexibility for connecting the N+,P diode of FIG. $12E_1$ to other semiconductor devices in the same monolithic or integrated structure.

In FIG. 12F, a PN diode is shown wherein ohmic contact is made, by the insulator breakdown technique of this invention, to the P-type region 128 and the N-type region 129 by conductors 120 and 122, respectively. If desired, the same PN diode can be made from the device of FIG. 11 using conductors 114 and 112.

In FIG. $12F_1$, a PN diode device is formed with two contacts each to P-type region 128 and N-type region 129. This device is similar to the diode device of FIG. $12E_1$ except for the provision of contacts to the P and N regions instead of the N+,P regions of FIG. $12E_1$. Conductors 114 and 120 are in ohmic contact with P region 128 and conductors 112 and 122 are in ohmic contact with N region 129.

Referring to FIGS. 12G, 12H, 12I and 12J, various transistor devices are depicted using the basic device shown in FIG. 11 and the insulator breakdown technique of this invention to cause insulator breakdown beneath at least three selected conductors. In FIG. 12E a conventional N+PN transistor is shown wherein ohmic contact is provided to N+ emitter region 126, the P-type base region 128, and the N-type collector region 129 by means of conductors 118, 120 and 122, respectively. Various conductor combinations can be used to make the same N+PN transistor device (i.e., 116, 114, 112; 116, 120, 122; etc.).

In FIG. 12H, plural emitter contacts 116 and 118 are provided to the N+ emitter region 126 while single contacts 120 and 122 are respectively provided to base region 128 and collector region 129. In some semiconductor devices, plural contacts permit high amounts of current to be supplied to the emitter of the transistor device.

In FIG. 12I, plural emitter and base contacts are provided to the N+PN transistor by breaking down insulator portions beneath conductors 114, 116, 118, 120 and 122. This type of transistor device permits additional wiring or connection flexibility.

In FIG. 12J, the N+PN transistor device is shown having plural emitter, base, and collector contact provided to the emitter, base, and collector regions of the transistor device.

Referring to FIG. 13, a dual-diode semiconductor device 130 is illustrated which comprises N+ region 132, P-type region 134 and N-type region 136. Ohmic contacts 138, 140 and 142, respectively, are provided to N-type region 136, N+ region 132 and P-type region 134. A voltage source 144 is electrically connected to conductor 146, which is located on thin insulating layer 148 in order to provide the necessary breakdown voltage needed to break down the insulator portion located beneath the conductor 146. The dual-diode device 130 is shown in electrical schematic form in FIG. 13A. By electrically connecting up the semiconductor regions 132, 134 and 136 as shown in FIG. 13A a dual-diode semiconductor device is provided which prevents current from flowing across both diodes regardless of current direction.

FIG. 14 depicts the device of FIG. 13 after insulator breakdown. The insulator portion located beneath conductor 146 is caused to break down by a voltage pulse from the voltage source 144 thus making electrical contact to the N+,p junction located beneath the conductor 146 as shown in FIG. 14. This results in shorting out one of the two dual-diodes thus permitting current to conduct across the remaining single diode. The transformation of the device of FIG. 13 from a dual-diode, nonconducting type device to the single-diode, conducting type device shown in FIG. 14 is advantageously used in, for example, a write-once, read-only memory array of the type shown in FIGS. 15 and 16.

MEMORY ARRAY

Figure 15:
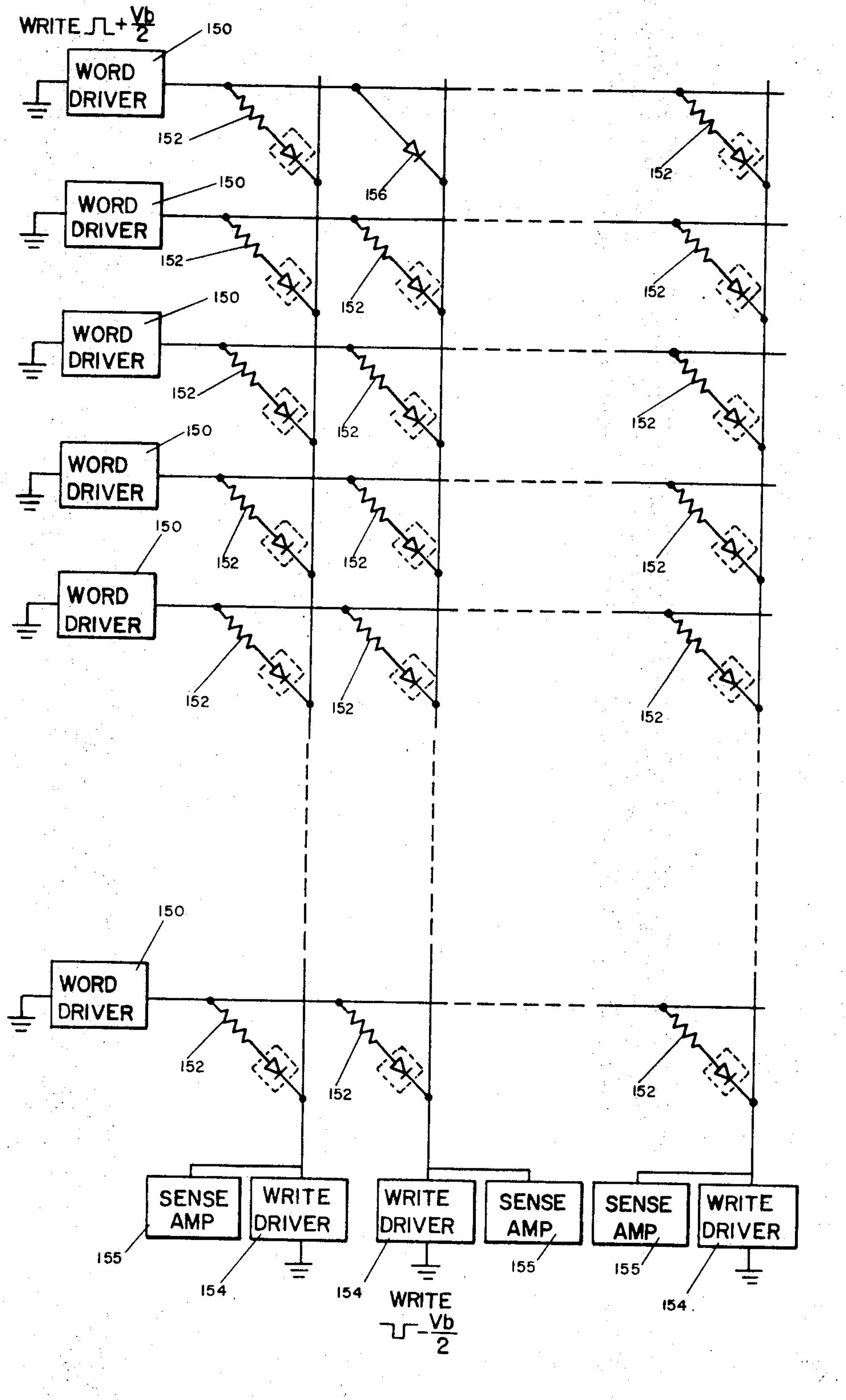
FIG. 15 is an electrical schematic representation of a write-once, read-only memory array having a plurality of interconnected semiconductor devices of the type shown in FIGS. 3 and 4.

FIG. 15 illustrates a write-once, read-only memory array using a plurality of interconnected semiconductor devices of the type shown in FIG. 3 (prior to insulator breakdown). In the memory array of FIG. 15, word drivers 150 are shown electrically connected to the conductors of each semiconductor device (see FIG. 3) that are separated from the P-type region by the thin insulating layer prior to insulator breakdown. The resistor provided by the thin insulator portion separating the conductors from the P-type region is designated in FIG. 15 by reference numeral 152. Write drivers 154 are electrically connected to the columns of devices of the memory array. Each write driver 154 is electrically connected to the N-type region of the semiconductor device (shown in FIG. 3). Each word driver 150 and each write driver 154 generate, when selected, voltage pulses having a magnitude of at least $V_b/2$ to cause insulator breakdown of the thin insulating layer. Sense amplifiers 155 are electrically connected to each column of devices of the memory array.

MEMORY WRITE OPERATION

In carrying out a memory write operation in the write-once, read-only memory array of FIG. 15, a positive voltage pulse of at least $+V_b/2$ is applied ($V_b$ is the insulator breakdown voltage) as shown above the first word driver 150 at the top of FIG. 15 to the row of semiconductor devices of the memory array connected to the first word driver. The $V_b/2$ voltage value is equal to one-half the breakdown voltage necessary to break down the insulator portion located beneath the conductor that is pulsed of each semiconductor device of the first row of the memory array. By applying a simultaneous negative voltage pulse of at least $-V_b/2$ to the selected write driver 154, which is in the illustration shown in FIG. 15 as being the second write driver, voltage breakdown of the semiconductor device located in row 1, column 2 is achieved, thereby changing the device from substantially a resistor type device to a conducting diode 156. In this manner a write-once, read-only operation is achieved on the device located at row 1, column 2 by transforming the substantially nonconducting resistor device 152 to the conducting diode device 156. This is an irreversible write operation which prevents the device at row 1, column 2 from being changed back to the initial resistor device 152. Hence, each semiconductor device of the memory array has a first electrical state which is different from the second electrical state that is achieved after a write operation. Although the memory array of FIG. 15 is designated as a write-once, read-only memory array, it should be evident to one skilled in the art that more than one write operation can be performed but to different devices of the memory array since each device can only receive one write operation.

READ OPERATION

In reading out the information in the memory array of FIG. 15, the sense amplifiers 155, which are electrically connected to each column of the memory array are used. These sense amplifiers are used in the read operation by sensing current in any one of the columns of the memory array after current is applied by the word driver associated with the row of the memory array that information is to be interrogated therefrom.

In this manner, reading of the information contained in the first row is achieved by applying a current to the row by means of the first word driver. Only the second sense amplifier located at the bottom of the second column would sense current flowing down the second column thereby indicating that the memory cell formed by the diode 156 is a byte of information due to the previous write operation. The other sense amplifiers 155 located at the bottom of the other columns of the memory array would not sense any current due to the high resistance of the resistor 152. This information sensing arrangement permits sensing of information from any memory cell that has been placed in a conducting condition from its initial nonconductive condition.

Figure 16:
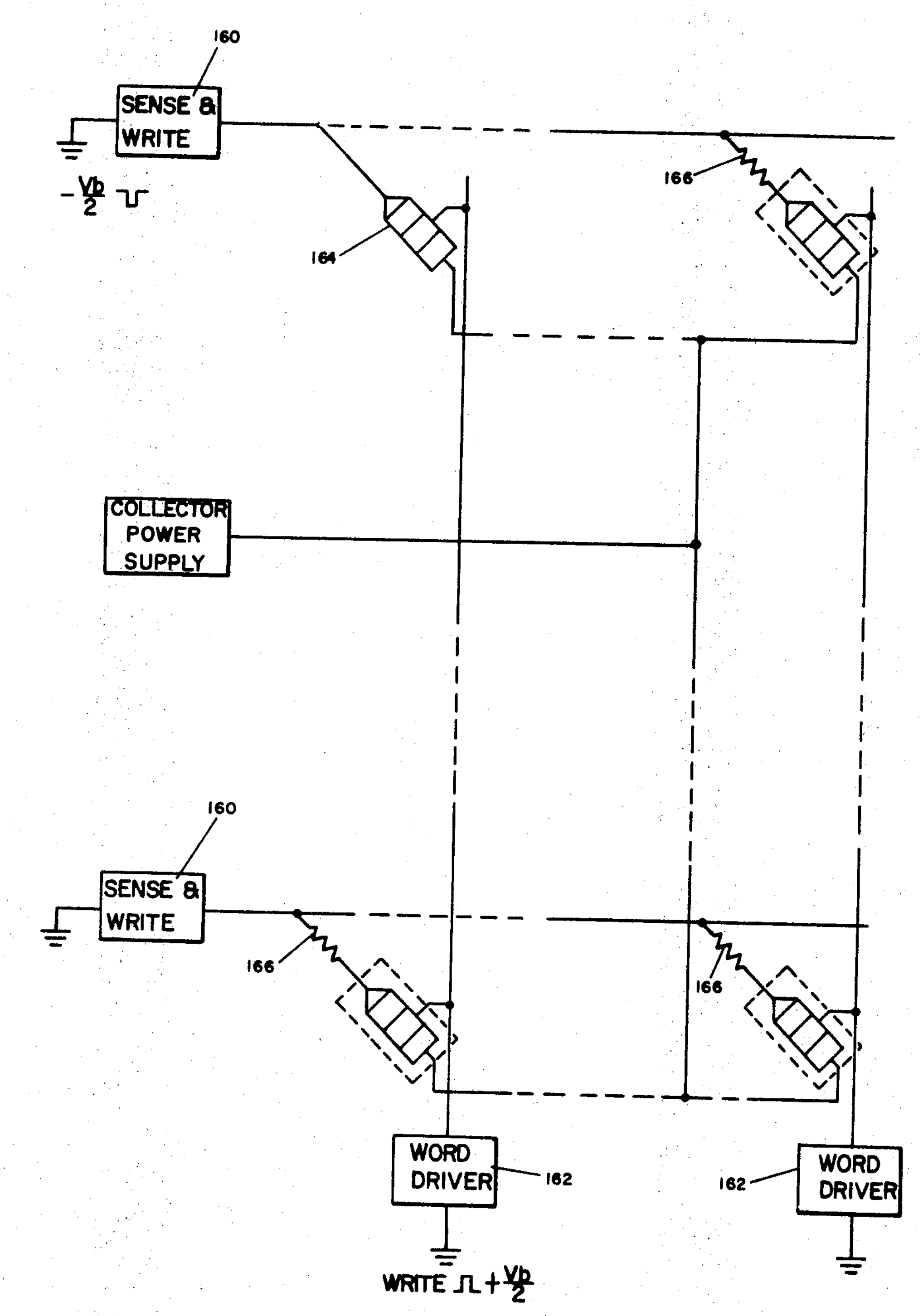
FIG. 16 is an electrical schematic representation of a write-once, read-only memory array having a plurality of semiconductor devices of the type shown in FIGS. 5 and 6.

Referring to FIG. 16, which is another embodiment of a write-once, read-only memory array, the semiconductor device of FIG. 5 (prior to insulator breakdown or a write operation) is used as the memory cell for each device of the memory array. In FIG. 16, sense amplifiers and write drivers 160 are electrically connected to each row of devices of the memory array. Word drivers 162 are electrically connected to the base or P-type region (see FIG. 5) of each device of the memory array.

WRITE OPERATION

Writing of information into the memory array of FIG. 16 is accomplished in substantially the same manner as writing into the memory array of FIG. 15. In writing, a negative voltage pulse of at least $-V_b/2$ is applied, for example, to the first row of memory cells as shown in FIG. 16 by the write driver 160. Simultaneous application of a positive voltage pulse of at least $+V_b/2$ applied by the word driver 162 which is connected to the first column. Therefore, transistor device 164 is created after being or changed from its first electrical state which is substantially a resistor device to its second electrical state which is a transistor (as shown in FIGS. 6 and 6A). The other devices of the memory array remain substantially as resistors 166. Each word driver 162 is electrically connected to the base of each transistor type device and each write driver 160 is connected to the resistor portion of each device which becomes the emitter after insulator breakdown. Simultaneous application of the negative voltage $-V_b/2$ from the write driver 160 to the selected row of the memory array and the positive voltage pulse $+V_b/2$ from the word driver 162 connected to the selected column of the memory array provides insulator breakdown.

READ OPERATION

Reading of the memory array of FIG. 16 is accomplished by applying, by means of the word driver 162, current to the selected column of the memory array. The transistor 164 conducts current due to the biasing of the base region thereof by means of the current supplied by the word driver 162. The first sense amplifier 160 senses the current in the first row of memory devices associated therewith and indicates that the transistor device 160 is a byte of information. The memory array of FIG. 16, because of its transistor type devices, is especially useful in write-once, read-only, memory arrangements.

If desired, a voltage pulse can be used in the read operations of the memory arrays of FIGS. 15 and 16. Consequently, the sense amplifiers would serve to sense the change in voltage which would result if information is contained in a particular byte.

It should be evident to those skilled in the art that while some of the embodiments or devices of this invention are shown as NPN transistors or PN diodes, the practice of this invention can be carried out using the opposite type devices (i.e. PNP transistors and NP diodes, etc.).

While the invention has been particularly shown and described with reference to preferred embodiments thereof, it will be understood by those skilled in the art that the foregoing and other changes in form and details may be made therein without departing from the spirit and scope of the invention.

We claim:

1. A semiconductor device comprising, in combination, a semiconductor substrate having at least two regions of opposite type conductivity including one region of one type conductivity forming a part of said substrate;

a thin insulating layer located on one surface of said substrate over said two regions of opposite type conductivity;

a plurality of conductors located on one surface of said thin insulating layer over said two regions of opposite type conductivity; and means for applying a differential voltage to said conductors of a sufficient magnitude and duration to break down the portion of said insulating layer located beneath at least one of said conductors, said one conductor being in ohmic contact with said region of one type conductivity after breakdown of the insulating layer portion, said region of one type conductivity and said conductor in ohmic contact therewith being at least a portion of one of an active and passive device.

2. A semiconductor device in accordance with claim 1 wherein said thin insulating layer having a thickness in the range of about 50 to about 1,000 Angstroms.

3. A semiconductor device in accordance with claim 2 wherein said thin insulating layer having a thickness in the range of about 100 to about 600 Angstroms.

4. A semiconductor device in accordance with claim 1 wherein said voltage applied to said one conductor to break down the portion of said insulating layer locate beneath said one conductor being less than 100 volts.

5. A semiconductor device in accordance with claim 4 wherein said voltage applied to said one conductor to break down the portion of said insulating layer located beneath said one conductor being in the range of from about 5 to about 50 volts.

6. A semiconductor device in accordance with claim 5 wherein said voltage applied to said one conductor to break down the portion of said insulting layer located beneath said one conductor being in the range of from about 5 to about 30 volts.

7. A semiconductor device in accordance with claim 1 wherein said region of one type conductivity having a relatively low resistivity, said low resistivity region having an impurity concentration of at least $10^{20}$ atoms per cubic centimeter.

8. A semiconductor device in accordance with claim 7 wherein said low resistivity region comprising the emitter of a transistor.

9. A semiconductor device in accordance with claim 1 wherein said low resistivity region and said one conductor comprising an underpass conductor.

10. A semiconductor device in accordance with claim 7 wherein said low resistivity region comprising a portion of a diode.

11. A semiconductor device in accordance with claim 1 wherein said region of one type conductivity being a relatively high resistivity, said high resistivity region having an impurity concentration of less than $10^{20}$ atoms per cubic centimeter.

12. A semiconductor device in accordance with claim 11 wherein said high resistivity region comprising a resistor.

13. A semiconductor device in accordance with claim 11 wherein said high resistivity region comprising a portion of a diode.

14. A semiconductor device in accordance with claim 11 wherein said high resistivity region comprising a collector of a transistor.

15. A semiconductor device in accordance with claim 11 wherein said high resistivity region comprising a collector of a transistor.

16. A semiconductor device in accordance with claim 1 wherein at least two conductors are located on said thin insulating layer, said voltage means applied to both of said two conductors to break down a portion of said insulating layer located beneath each of said two conductors, one of said two conductors being in ohmic contact with said region of one type conductivity after insulator breakdown, a region of opposite type conductivity from said region of one type conductivity forming a part of said substrate, the other of said two conductors being in ohmic contact with said region of opposite type conductivity after insulator breakdown.

17. A semiconductor device in accordance with claim 1 wherein at least three conductors are located on said thin insulating layer, said voltage means applied to each of said three conductors to breakdown a portion of said insulating layer located beneath each of said three conductors, one of said three conductors being in ohmic contact with said region of one type conductivity after insulator breakdown, a region of opposite type conductivity from said region of one type conductivity forming part of said substrate, sa second of said three conductors being in ohmic contact with said region of opposite type conductivity after insulator breakdown, a second region of the same conductivity type as said first region of one conductivity type, the third of said three conductors being in ohmic contact with said second region of said one conductivity type after insulator breakdown.

18. A semiconductor device comprising, in combination, a semiconductor substrate having regions of opposite type conductivity;

a thin insulating layer located on one surface of said substrate;

a plurality of conductors located on one surface of said thin insulating layer over said regions of opposite type conductivity; and voltage means connected to said conductors for applying a differential voltage to said conductors for breaking down the insulator portions beneath selected conductors to form at least one of active and passive devices.

19. A semiconductor device in accordance with claim 18 wherein one of said selected conductors being in electrical contact with a resistor after insulator breakdown.

20. A semiconductor device in accordance with claim 18 wherein one of said selected conductors being in electrical contact with a diode after insulator breakdown.

21. A semiconductor device in accordance with claim 18 wherein one of said selected conductors being in electrical contact with a transistor after insulator breakdown.

22. A semiconductor device in accordance with claim 18 wherein one of said selected conductors shorting out a PN junction between two of said regions of opposite type conductivity.

23. A semiconductor device in accordance with claim 18 wherein at least one of said plurality of conductors being in ohmic contact with at least one of said regions before and after insulator breakdown.

24. A semiconductor device in accordance with claim 18 wherein said thin insulating layer having a thickness in the range of from about 100 to about 600 Angstroms, said voltage applied to said selected conductors being in the range of from about 5 to about 30 volts.

25. A memory array comprising, in combination, a plurality of semiconductor devices interconnected to provide a memory array, each of said plurality of semiconductor devices comprising a semiconductor substrate having regions of opposite type conductivity, a thin insulating layer located on a surface of said substrate over said regions of opposite type conductivity, a plurality of conductors in contact with said thin insulating layer, writing means for writing information into said memory array by applying a differential voltage of a sufficient magnitude and duration to said conductors of a selected memory semiconductor device to break down the portion of said thin insulating layer located beneath at least one of said conductors for making electrical contact to said substrate to change the electrical nature of said selected memory device; and reading means for sensing the information contained in said monolithic memory array.

26. A memory array in accordance with claim 25 wherein at least one of said plurality of semiconductor devices comprising a resistor before insulator breakdown and a diode after insulator breakdown.

27. A memory array in accordance with claim 25 wherein at least one of said plurality of semiconductor devices comprising a resistor before insulator breakdown and a transistor after insulator breakdown.

28. A memory array in accordance with claim 25, wherein at least one of said plurality of semiconductor devices comprising a pair of back-to-back diodes before insulator breakdown and a single diode after insulator breakdown.

29. A memory array in accordance with claim 25 wherein said writing means comprising a first voltage source means electrically connected to each selected row of said array, said first voltage source means providing a voltage less than the voltage needed to break down the insulator portion located beneath said conductor, and a second voltage source means electrically connected to each selected column of said memory array, said second voltage source means providing a voltage less than the voltage needed to break down the insulator portion located beneath said conductor, said first and second voltage source means together providing the voltage amount needed to break down the insulator portion of said selected memory semiconductor device.

30. A memory array comprising, in combination, a plurality of semiconductor devices having regions of opposite type conductivity, an insulating layer located on a surface of said devices, a plurality of conductors in contact with said insulating layer and interconnected to provide a memory array, each of said semiconductor devices having a first electrical state prior to receiving a writing signal and an irreversible different second electrical state after receiving a writing signal;

writing means electrically connected to said memory array for applying a differential voltage to said plurality of conductors for selecting at least one of said plurality of semiconductor devices and placing said selected semiconductor device in said second electrical state; and reading means for sensing the information contained in said memory array.

31. A memory array in accordance with claim 30 wherein said first electrical state of said semiconductor devices being a resistor.

32. A memory array in accordance with claim 31 wherein said second electrical state being a diode.

33. A memory array in accordance with claim 31 wherein said second electrical state being a transistor.

34. A memory array in accordance with claim 30 wherein said first electrical state being nonconducting, said second electrical state being conducting.

35. A memory array in accordance with claim 30 wherein said first electrical state being a nonconducting pair of back-to-back diodes, said second electrical state being a conducting single diode.

36. A memory array in accordance with claim 30 wherein said first electrical state exhibiting a passive device characteristic, said second electrical state exhibiting an active device characteristic.

UNITED STATES PATENT OFFICE
CERTIFICATE OF CORRECTION

Patent No. 3,576,549 Dated April 27, 1971

Inventor(s) Martin S. Hess et al.

It is certified that error appears in the above-identified patent and that said Letters Patent are hereby corrected as shown below:

Col. 6 line 50 "$m_{R_b}$" should be -- $\frac{m}{R_b}$ "

Col. 8 line 32 "$P_j$" should be -- $P_i$ --

Col. 8 line 67 "$N_a = -Log_e P_m$" should be -- $N_a = -I\ Log_e P_m$ -

Col. 12 line 66 "subclass a" should be -- subclass i --

Col. 13 line 62 "but 1201" should be -- bus 1201 --

Col. 25 line 16 " $\left[(old\ Z_i)\alpha(\frac{1+N_o}{1})\right.$ " should be -- $\left[(old\ Z_i)\alpha(\frac{1+N_o}{2})\right.$ -

Col. 25 line 31 "$\alpha=0.25\frac{N_o}{1}$" should be -- $\alpha=0.25\frac{1}{N_o}$ --

UNITED STATES PATENT OFFICE
CERTIFICATE OF CORRECTION

Patent No. 3,576,549 Dated April 27, 1971

Inventor(s) Martin S. Hess et al. PAGE - 2

It is certified that error appears in the above-identified paten and that said Letters Patent are hereby corrected as shown below:

Col. 25 line 59 "over the head" should be -- over the lead --

Col. 27 line 39 "to the seletced" should be -- to the selected

Col. 28 line 71 "2404 of Fig. 24" should be -- 2402 of Fig. 24

Col. 29 line 47 "register A" should be -- register $A_k$ --

Col. 31 line 15 "in its "?" state" should be -- in its "1" state -

Col. 32 line 33 "It scan counter" should be -- If scan counter -

Col. 32 line 64 "halted in supplied" should be -- halted is supplied

UNITED STATES PATENT OFFICE
CERTIFICATE OF CORRECTION

Patent No. 3,576,549 Dated April 27, 1971

Inventor(s) Martin S. Hess et al. PAGE - 3

It is certified that error appears in the above-identified patent and that said Letters Patent are hereby corrected as shown below:

Col. 33 line 4 "1202 of Fig. 12"

should be -- 12A2 of Fig. 12 -

Col. 33 line 72 "One located"

should be -- Once located

Signed and sealed this 8th day of August 1972.

(SEAL)
Attest:

EDWARD M.FLETCHER,JR.
Attesting Officer

ROBERT GOTTSCHALK
Commissioner of Patents